United States Patent [19]

Rogalla

[11] Patent Number: 5,462,494
[45] Date of Patent: Oct. 31, 1995

[54] BELT TENSIONER AND METHOD OF MAKING THE SAME

[75] Inventor: Jan N. Rogalla, Everton, Mo.

[73] Assignee: Dayco Products, Inc., Dayton, Ohio

[21] Appl. No.: 326,618

[22] Filed: Oct. 20, 1994

[51] Int. Cl.⁶ ..................................................... F16H 7/08
[52] U.S. Cl. ................................................................. 474/135
[58] Field of Search .......................... 474/101, 109–111, 474/113–117, 133–138

[56] References Cited

U.S. PATENT DOCUMENTS

| | | | |
|---|---|---|---|
| 4,596,538 | 6/1986 | Henderson | 474/135 |
| 4,952,197 | 8/1990 | Henderson | 474/135 |
| 5,149,306 | 9/1992 | Sidwell et al. | 474/135 |
| 5,342,249 | 8/1994 | Gardner et al. | 474/135 |
| 5,348,514 | 9/1994 | Foley | 474/135 |
| 5,407,397 | 4/1995 | Foley | 474/135 |

OTHER PUBLICATIONS

Copending patent application of Dewey D. Henderson, Ser. No. 08/326,559, filed 20 Oct. 1994 (Dayco Products, Inc.). Copending patent application of Mark P. Foley, Ser. No. 124,749, filed Sep. 21, 1993.

*Primary Examiner*—Michael Powell Buiz
*Attorney, Agent, or Firm*—Joseph V. Tassone

[57] ABSTRACT

A tensioner for a power transmission belt that is adapted to be operated in an endless path and method of making the same are provided, the tensioner comprising a support member for being fixed relative to the belt, a belt engaging arm pivotally carried by the support member, and a spiraled spring having an outer end interconnected to the support member and having an inner end interconnected to the belt engaging arm for urging the belt engaging arm relative to the support member and against the belt with a force to tension the belt, the support member having an internal wall provided with an abutment extending inwardly therefrom and cooperating therewith to define an angled and closed ended slot therebetween that receives the outer end of the spring therein to interconnect the outer end of the spring to the support member.

20 Claims, 6 Drawing Sheets

BELT TENSIONER AND METHOD OF MAKING THE SAME

BACKGROUND OF THE INVENTION

1. Field of the Invention

This invention relates to a new tensioner for an endless power transmission belt or the like and to a new method of making such a tensioner.

2. Prior Art Statement

It is known to provide a tensioner for a power transmission belt that is adapted to be operated in an endless path, the tensioner comprising a support member for being fixed relative to the belt, a belt engaging arm movably carried by the support member, and a spiraled spring having an outer end interconnected to the support member and having an inner end interconnected to the belt engaging arm for urging the belt engaging arm relative to the support member and against the belt with a force to tension the belt, the support member having a pivot opening passing therethrough, the belt engaging arm having a pivot part thereof rotatably disposed in the pivot opening so as to rotate therein, the support member having an internal wall provided with a slot passing completely therethrough and through which the outer end of the spring extends to interconnect the outer end of the spring to the support member. For example, see the U.S. patent to Henderson, U.S. Pat. No. 4,952,197 and the U.S. patent to Henderson, U.S. Pat. No. 4,596,538.

It is also known to applicant to form the support member from polymeric material and have an annular surface disposed substantially concentrically about the longitudinal axis of the pivot opening thereof so that an annular surface of the belt engaging arm can be disposed directly in sliding engagement with the annular surface of the support member without requiring an anti-friction bushing means to be disposed therebetween. For example, see the copending patent application of Dewey D. Henderson Ser. No. 08/326,559, filed 20 Oct. 1994, (Dayco Products, Inc. Docket No. 93-11).

It is also known to have the spiraled spring for a tensioner be offset between the inner end thereof and the outer end thereof and be so arranged in the tensioner that the spiraled spring urges the cooperating annular surfaces of the support member and the belt engaging arm toward each other with a certain force. For example, see the copending patent application of Mark P. Foley, Ser. No. 124,749, filed Sep. 21, 1993.

It is also known to have the cooperating surfaces of the support member and the belt engaging arm respectively angled to the longitudinal axis of the pivot opening of the support member. For example, see the U.S. patent to Sidwell et al, U.S. Pat. No. 5,149,306.

SUMMARY OF THE INVENTION

It is one of the features of this invention to provide a new belt tensioner that has the mechanical spring means thereof substantially sealed from contamination.

In particular, it is believed according to the teachings of this invention that the support member of a prior known belt tensioner can be provided with a unique internal slot means therein to receive the outer end of the spiraled spring of the tensioner therein to interconnect that outer end with the support member and thereby permit the chamber receiving the spiraled spring to be substantially sealed from the exterior of the tensioner to prevent contamination therein.

For example, one embodiment of this invention comprises a tensioner for a power transmission belt that is adapted to be operated in an endless path, the tensioner comprising a support member for being fixed relative to the belt, a belt engaging arm movably carried by the support member, and a spiraled spring having an outer end interconnected to the support member and having an inner end interconnected to the belt engaging arm for urging the belt engaging arm relative to the support member and against the belt with a force to tension the belt, the support member having a pivot opening passing therethrough, the belt engaging arm having a pivot part thereof rotatably disposed in the pivot opening so as to rotate therein, the support member having an internal wall means provided with an abutment means extending inwardly therefrom and cooperating therewith to define an angled and closed ended slot means therebetween that receives the outer end of the spring therein to interconnect the outer end of the spring to the support member.

Accordingly, it is an object of this invention to provide a new tensioner for a power transmission belt that is adapted to be operated in an endless path, the tensioner of this invention having one or more of the novel features of this invention as set forth above or hereinafter shown or described.

Another object of this invention is to provide a new method of making such a tensioner, the method of this invention having one or more of the novel features of this invention as set forth above or hereinafter shown or described.

Another object of this invention is provide a new part for such a tensioner, the new part of this invention having one or more of the novel features of this invention as set forth above or hereinafter shown or described.

Another object of this invention is to provide a new method of making such a part, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangements as desired.

Therefore, this invention is not to be limited to only the embodiments illustrated in the drawings because the drawings are merely utilized to illustrate one of the wide variety of uses of this invention.

Figure 1:
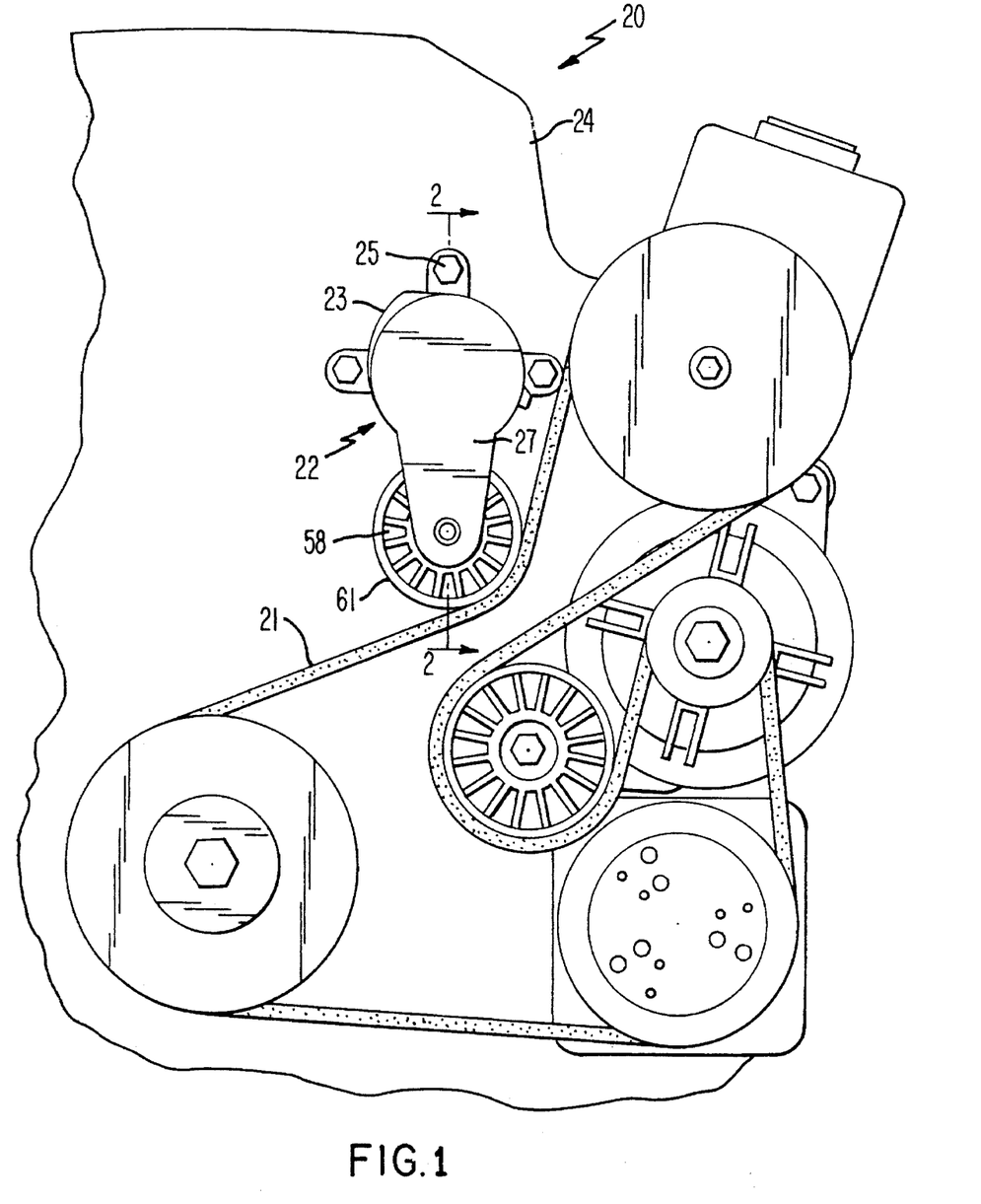
FIG. 1 is a view looking toward the front end of an automobile engine which utilizes the new belt tensioner of this invention.

Referring now to FIG. 1, an automobile engine is generally indicated by the reference numeral 20 and utilizes an endless power transmission belt 21 for driving a plurality of driven accessories as is well known in the art, the new belt tensioner of this invention being generally indicated by the reference numeral 22 and being utilized to provide a tensioning force on the belt 21 in the manner hereinafter set forth.

The endless power transmission belt 21 may be of any suitable type known in the art and is preferably made primarily of polymeric material because the unique features of the tensioner 22 of this invention readily permit the tensioner 22 to tension a belt having a load carrying cord in an effective manner as fully set forth in the aforementioned U.S. Patent to Henderson, U.S. Pat. No. 4,596,538, whereby this U.S. patent is being incorporated into this disclosure by this reference thereto.

Also, because many of the parts of the belt tensioner 22 of this invention and the details of the operation thereof are fully described and illustrated in the other aforementioned U.S. Patent to Henderson, U.S. Pat. No. 4,952,197, this U.S. patent is also being incorporated into this disclosure by this reference thereto whereby a further discussion of the engine 21 and the operation of the tensioner 22 on the belt 21 is deemed unnecessary.

Figure 2:
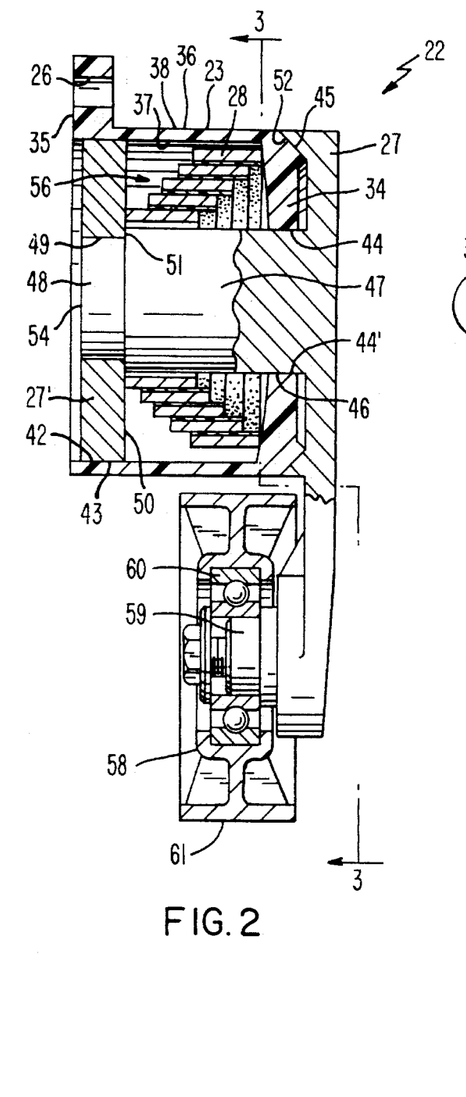
FIG. 2 is an enlarged fragmentary cross-sectional view of just the new belt tensioner of this invention and is taken in the direction of the arrows 2—2 of FIG. 1.
Figure 3:
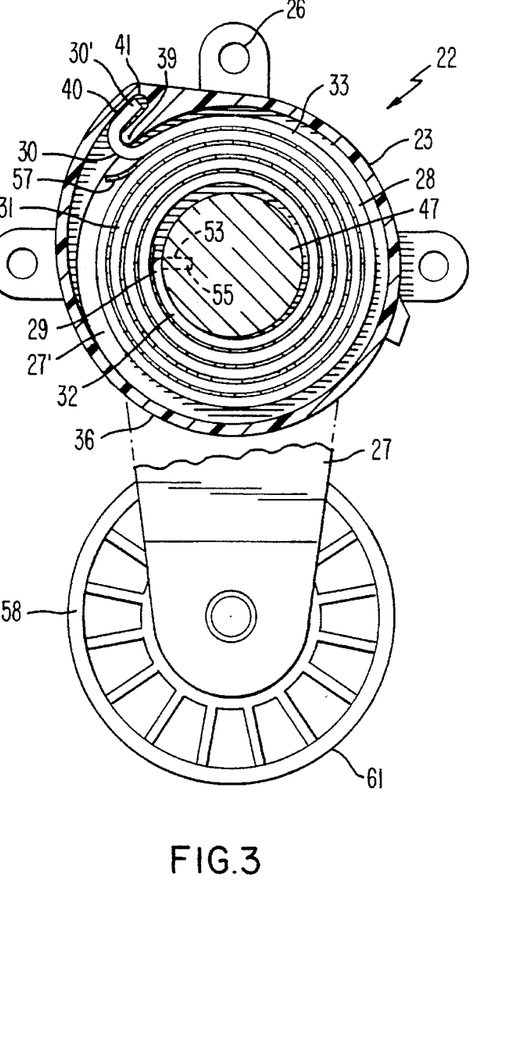
FIG. 3 is a cross sectional view taken on line 3—3 of FIG. 2.
Figures 4, 5, 6:
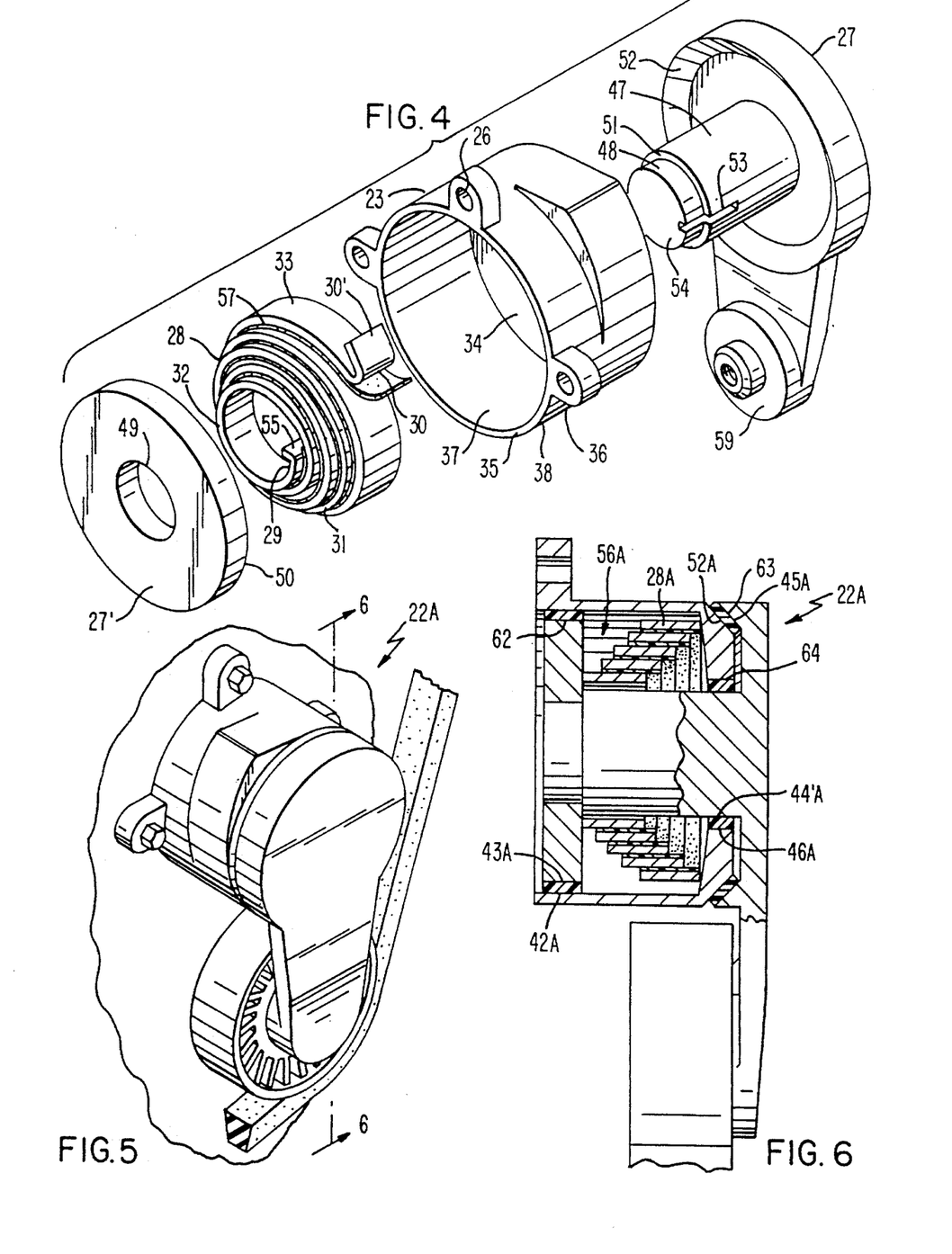
FIG. 4 is an exploded perspective view of the various parts that form the belt tensioner of FIGS. 1-3.
FIG. 5 is a fragmentary perspective view similar to FIG. 1 and illustrates another tensioner of this invention.
FIG. 6 is an enlarged fragmentary cross-sectional view of just the belt tensioner of FIG. 5 and is taken in the direction of the arrows 6—6 of FIG. 5.

As best illustrated in FIGS. 2–4, the new belt tensioner 22 of this invention comprises a one-piece support member 23 formed of any suitable polymeric material, such as a nylon sold under the trademark NYLATRON by the Polymer Corporation of Reading, Pa., which may be filled with up to 33% glass fibers and being adapted to be fixed to a mounting bracket or support structure 24 of the engine 20 by a plurality of fastening means 25 extending through suitable openings 26 in the support member as illustrated in FIGS. 1 and 2.

A belt engaging arm 27 is movably carried by the support member 23 in a manner hereinafter set forth and is die cast of any suitable metallic material, such as aluminum material, and has a substantially circular metallic arm plate 27' that forms a part of the belt engaging arm 27 and is assembled thereto in a manner hereinafter set forth.

The tensioner 22 has a mechanical spring means 28 provided with an inner end 29 that is operatively interconnected to the belt engaging arm 27 in a manner hereinafter set forth and an outer end 30 that is operatively interconnected to the support member 23 in a manner hereinafter set forth, the spring means 28 comprising a substantially flat metallic member wound in a spiraled manner to define spirals or coils 31 thereof whereby an inner spiral 32 is disposed adjacent the inner end 29 thereof and an outer spiral 33 is disposed adjacent the outer end 30 thereof as illustrated in FIG. 3.

The inner end 29 of the spring 28 is axially offset relative to the outer end 30 so that the spirals 31 are offset relative to each other in the manner illustrated in FIG. 2 and have a natural tendency to be spaced apart a certain distance in the axial direction thereof from each other so that when the spring 28 is forced in an axial manner between the inner end 29 and the outer end 30 thereof, the spring 28 has a natural tendency to expand axially and thereby provide an axial force that is utilized to provide friction dampening for the tensioner 22 in the manner fully set forth in the aforementioned copending patent application of Mark P. Foley, Ser. No. 124,749, filed Sep. 21, 1993, and since the issue fee for this copending patent application has been paid, this U.S. patent application is being incorporated into this disclosure by this reference thereto.

The support member 23 is substantially cup-shaped so as to define a closed end 34 and an open end 35 thereof together with a generally cylindrical or annular wall means 36 that interconnects the open end 35 with the closed end 34, the annular wall means 36 having an internal peripheral surface means 37 and an external peripheral surface means 38.

The annular wall means 36 of the support member 23 has an abutment 39 extending inwardly therefrom at an angle relative to the internal peripheral surface means 37 thereof to cooperate therewith and provide an angularly disposed slot means 40 that is closed at the end 41 thereof so as to be completely sealed from the external peripheral surface 38 of the wall means 36 as illustrated in FIG. 3 upon assembly thereof.

In this manner, the looped bent outer end 30 of the spring 28 has the free end tang 30' thereof inserted in the closed ended slot means 40 as illustrated in FIG. 3 to operatively interconnect the outer end 30 of the spring 28 to the support member 23 as illustrated.

The internal peripheral surface means 37 of the support member 23 at the open end 35 thereof provides an annular surface 42 against which an outer annular peripheral surface means 43 of the arm plate 27' is adapted to rotate or pivot as the belt engaging arm 27 is providing its belt tensioning function.

The closed end 34 of the support member 23 has an opening 44 passing substantially centrally therethrough and is provided with an external angled annular surface 45 that is spaced from and concentrically disposed relative to the opening 44 whereby the opening 44 defines an annular surface means 44' that is adapted to be disposed in contact with an external peripheral surface means 46 of a pivot part or shaft 47 of the belt engaging arm 27 that extends through the opening 44 and has a reduced end portion 48 for being received in an opening 49 in the arm plate 27' to be subsequently fastened thereto by being brackered and staked thereto during the assembly of the tensioner 22 in a manner hereinafter set forth whereby a side 50 of the arm plate 27' abuts against an annular shoulder 51 of the belt engaging arm 27 as illustrated in FIG. 2.

The belt engaging part 27 has an angled annular surface means 52 that is adapted to be disposed directly in sliding engagement with the annular angled surface means 45 of the support member 23 when the belt engaging arm 27 has been assembled to the support member 23 in the manner illustrated in FIG. 2.

As illustrated in FIG. 4, the pivot part 47 of the belt engaging arm 27 has a slot 53 formed therein and extending from the substantially flat free end 54 of the pivot part 47 so that the bent free end portion 55 of the inner end 29 of the spring 28 can be assembled onto the pivot shaft 47 with the free end 55 in the slot 53 in the manner illustrated in FIG. 3 to operatively interconnect the inner end 29 of the spring 28 to the pivot part 47 of the belt engaging arm 27.

Thus, the spring 28 is wound up in such a manner that when the respective ends 29 and 30 thereof are respectively interconnected to the belt engaging arm 27 and the support member 23 in the manner previously set forth, the spring 28 tends to unwind and thereby pivot the belt engaging arm 27 relative to the support member 23 with a force that is utilized to tension the belt 21 all in the manner fully set forth in the aforementioned U.S. patents to Henderson.

However, after the spring 28 is assembled with the belt engaging arm 27 and the support member 23, the arm plate 27' is assembled on the end 48 of the pivot part 47 of the belt engaging arm 27 into the position illustrated in FIG. 2 wherein the side 50 of the arm plate 27' abuts the shoulder 51 and moves the inner end 29 and inner coil 32 axially toward the closed end 34 of the support member 23 while the outer end 30 and outer spiral 33 of the spring 28 is prevented from axially moving therewith by the closed end 34 of the support member 23 so that the coils 31 of the spring 28 have a natural force tending to axially move the inner end 29 and the outer end 30 of the spring 28 axially away from each other and this force urges the annular surface means 52 of the belt engaging arm 27 against the annular surface means 45 of the support member 23 to provide a frictional dampening force therebetween to tend to retard pivoting movement of the arm 27 relative to the support member 23 all for the reasons fully set forth in the aforementioned U.S. patents to Henderson as well as set forth in the aforementioned U.S. patent to Sidwell et al, U.S. Pat. No. 5,149,306 whereby this U.S. patent is being incorporated into this disclosure by this reference thereto.

Therefore, it can be seen that when the arm plate 27' is assembled on the end 48 of the pivot part 47 of the belt engaging arm 27 and is fastened thereto in the manner previously set forth, the arm plate 27' provides an axial compaction of the spring 28 which is utilized for a dampening force for the tensioner 22.

In addition, the arm plate 27' through the outer peripheral surface means 43 thereof is disposed in sliding engagement with the annular surface means 42 of the open end 35 of the support member 23 while the pivot part 47 has its external peripheral surface means 47 disposed in sliding contact with the annular peripheral surface means 44' of the closed end 34 of the support member 23 whereby the annular surface means 44' and 42 of the support member 23 provide a pivot opening through the support member 23, while the surface means 46 and 43 of the part 47 of the belt engaging arm 27 and the arm plate 27' provide a pivot means respectively cooperating therewith.

In addition, it can be seen that the cooperating surface means 42, 43 and 44', 46 of the support means 23 and the belt engaging arm 27 substantially seals closed a resulting spring chamber 56 that is formed in the tensioner 22 between the belt engaging arm 27 and the support member 23 and containing the spring 28 therein so as to prevent contamination therein that would adversely affect the operation of the tensioner 22.

If desired, a suitable anti-friction tape 57 can be disposed between the spirals 31 of the spiraled spring 28 to reduce any friction between the spirals 31 in a manner well known in the art.

The belt engaging arm 27 has a suitable pulley 58 rotatably-disposed on an end 59 thereof by suitable bearing means 60 so that an outer peripheral surface means 61 of the pulley 58 can engage the belt 21 in the manner illustrated in FIG. 1 whereby the tensioner 22 can tension the belt 21 in a manner well known in the art.

Thus, it is believed that the tensioner 22 of this invention will operate in an effective manner while having a substantially reduced number of parts over prior known tensioners as separate anti-friction bushings are not needed for the tensioner 22 of this invention. Furthermore, the incidence of stackup tolerances is similarly reduced. As the tensioner 22 wears, the inwardly directed force provided by the spring 28 on the pivot part 47 maintains the frictional relationship between the support member 23 and the pivot part 47, and the bearing surfaces 42, 43, 44' 46 and 52 better maintain the alignment of the support member 23 at the pivot part 47 because these surfaces are typically at an increased radius from the longitudinal axis of the pivot part 47.

However, it is believed that the unique feature of this invention for substantially sealing the spring chamber means 56 of the tensioner 22 from the exterior of the tensioner 22 to prevent contamination of the chamber means 56 can be provided for a tensioner wherein the support member 23 is not formed of polymeric material.

Figure 7:
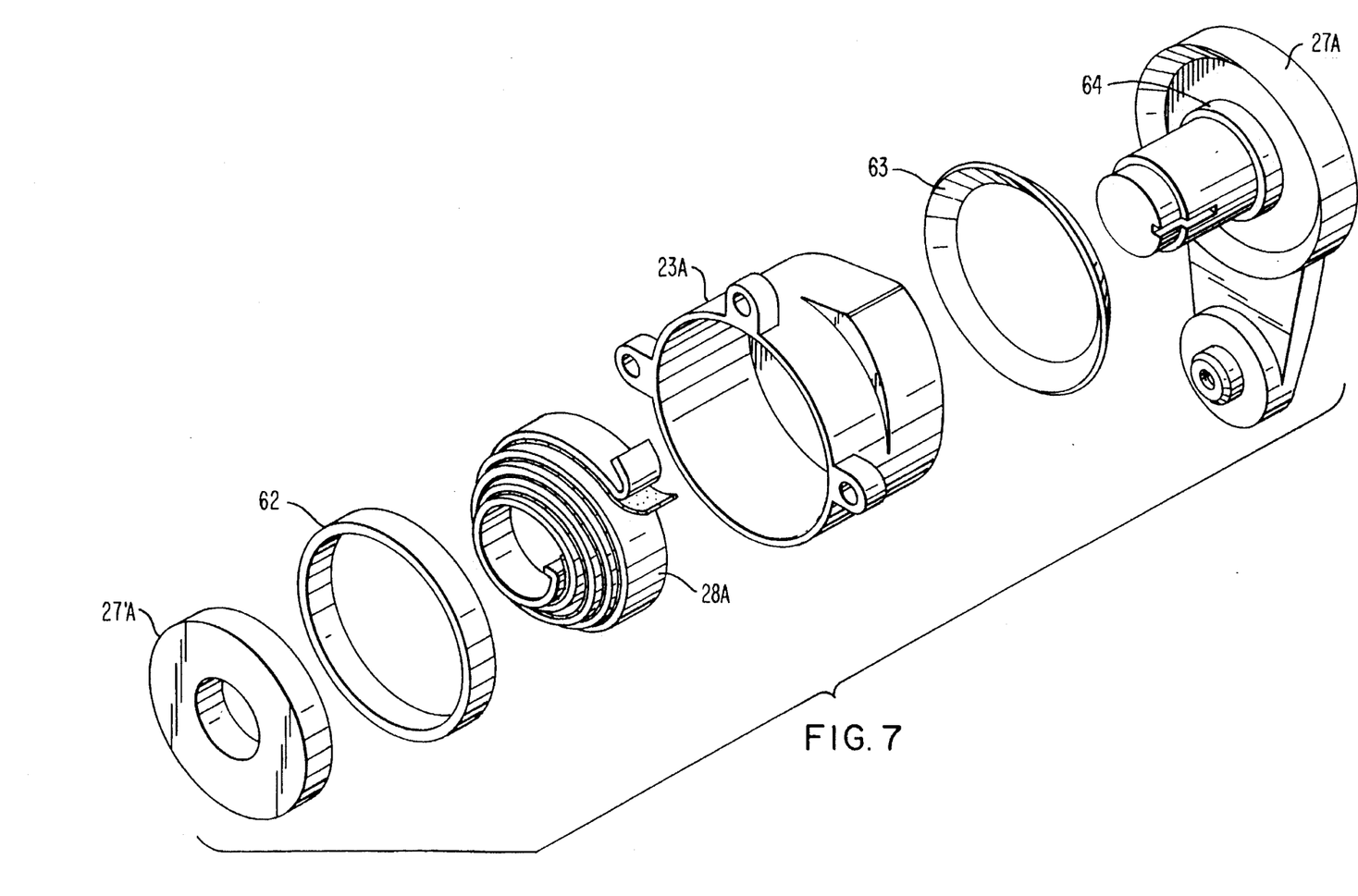
FIG. 7 is an exploded perspective view of the various parts that form the belt tensioner of FIGS. 5 and 6.
Figure 8:
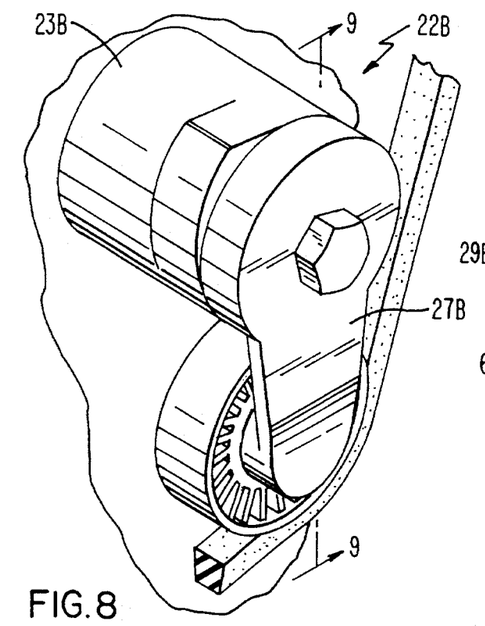
FIG. 8 is a view similar to FIG. 5 and illustrates another belt tensioner of this invention.

In particular, another tensioner of this invention is generally indicated by the reference numeral 22A in FIGS. 5–7 and parts thereof similar to the parts of the tensioner 22 previously described are indicated by like reference numerals followed by the reference letter "A".

As illustrated in FIGS. 5–7, it can be seen that the tensioner 22A is substantially identical to the tensioner 22 previously described except that the support member 23A thereof is formed of metallic material whereby three annular polymeric bushings 62, 63 and 64 are respectively disposed between the surface means 42A, 43A; 45A, 52A and 44'A, 46A.

Thus, the tensioner 22A of this invention performs in the same manner as the tensioner 22 previously described and is made in the same manner therewith except that the anti-friction bushings 62, 63 and 64 are utilized therewith.

Nevertheless, it can seen the chamber means 56A of the tensioner 22A is substantially sealed from the exterior of the tensioner 22A so that contaminants cannot reach the spring means 28A for the reasons previously set forth.

Another tensioner of this invention is generally indicated by the reference numeral 22B in FIGS. 8–11 and parts thereof similar to the parts of the tensioners 22 and 22A previously described are indicated by like reference numerals followed by the reference letter "B".

As illustrated in FIGS. 8–11, it can be seen that the support member 23B for the tensioner 22B which is formed of polymeric material in a manner similar to the support member 23 of the tensioner 22 has the open end 35B thereof ultrasonically welded to a surface 65 of a polymeric plate 66 which has its other side 67 adapted to be disposed against the support 24B and be secured thereto by a single fastening member 68 in a manner hereinafter set forth.

Figure 9:
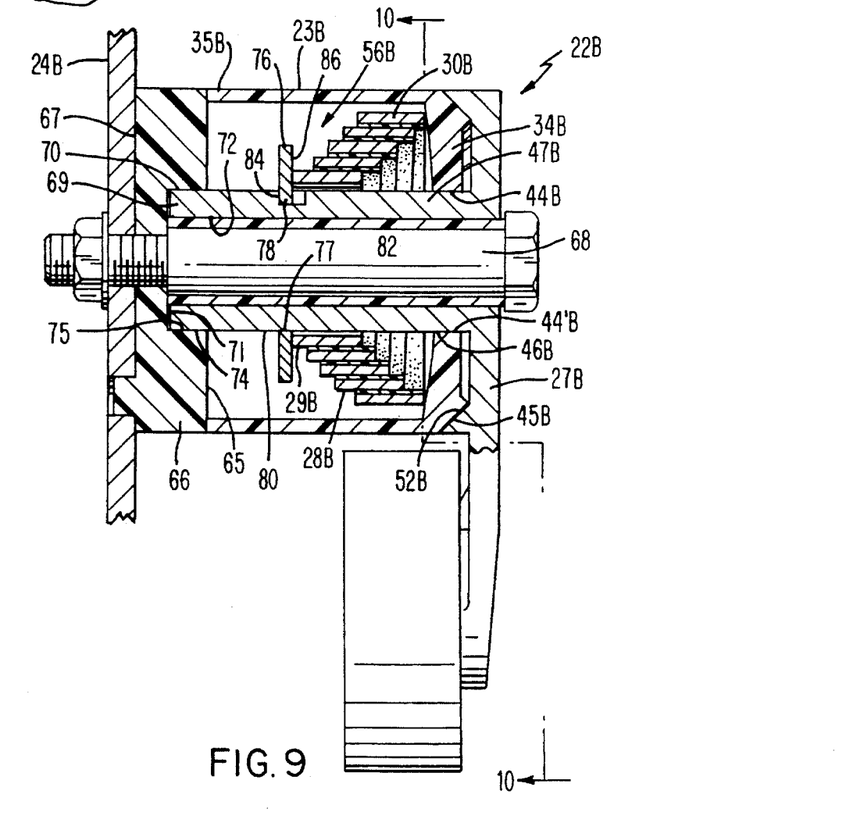
FIG. 9 is an enlarged fragmentary cross-sectional view taken on line 9—9 of FIG. 8.

The belt engaging arm 27B of the tensioner 22B has the pivot part 47B thereof not only passing through the opening 44B in the closed end 34B of the support member 23B, but also has a free end 69 thereof rotatably received in an opening 70 interrupting the side 65 of the support plate 66 and being disposed short of a closed end surface 71 of the opening 70 as illustrated in FIG. 9.

Figure 10:
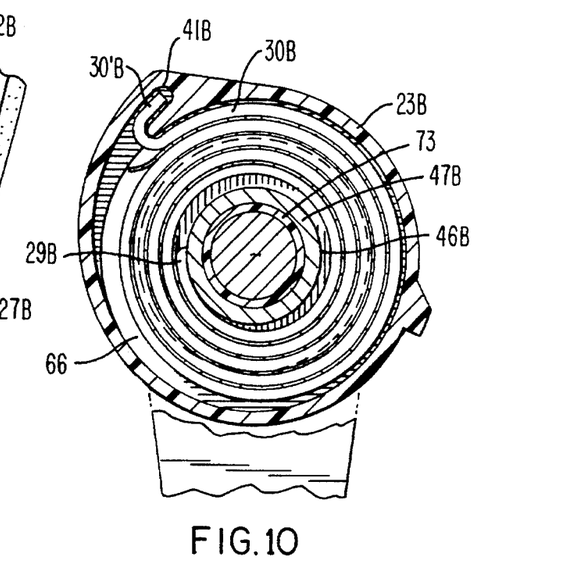
FIG. 10 is a fragmentary cross-sectional view taken on line 10—10 of FIG. 9.

The pivot part 47B of the belt engaging arm 27B is substantially tubular and has an opening 72 passing completely therethrough and receiving a tubular polymeric bushing 73 therein which permits the tubular part 47B to rotate on the fastening member 68 while the annular surface means 46B thereof rotates against the annular surface means 44'B of the support member 23B and an annular surface means 74 of the pivot part 47B rotates against an annular surface means 75 of the support plate 66 that is defined by the opening 70 thereof whereby it can be seen that the resulting chamber means 56B for the spring 28B is substantially sealed from the exterior of the tensioner 22B.

The belt engaging arm 27B carries a plate 76 which performs the same function as the plate 27' previously described for the tensioner 22 in that the same acts on the inner end 29B of the spring 28B to hold the inner end 29B in compacted relation relative to the outer end 30B so as to provide the force tending to axially move the angled surface means 52B of the belt engaging arm 27B against the annular surface means 45B of the support member 23B for the friction dampening purpose previously set forth.

Figure 11:
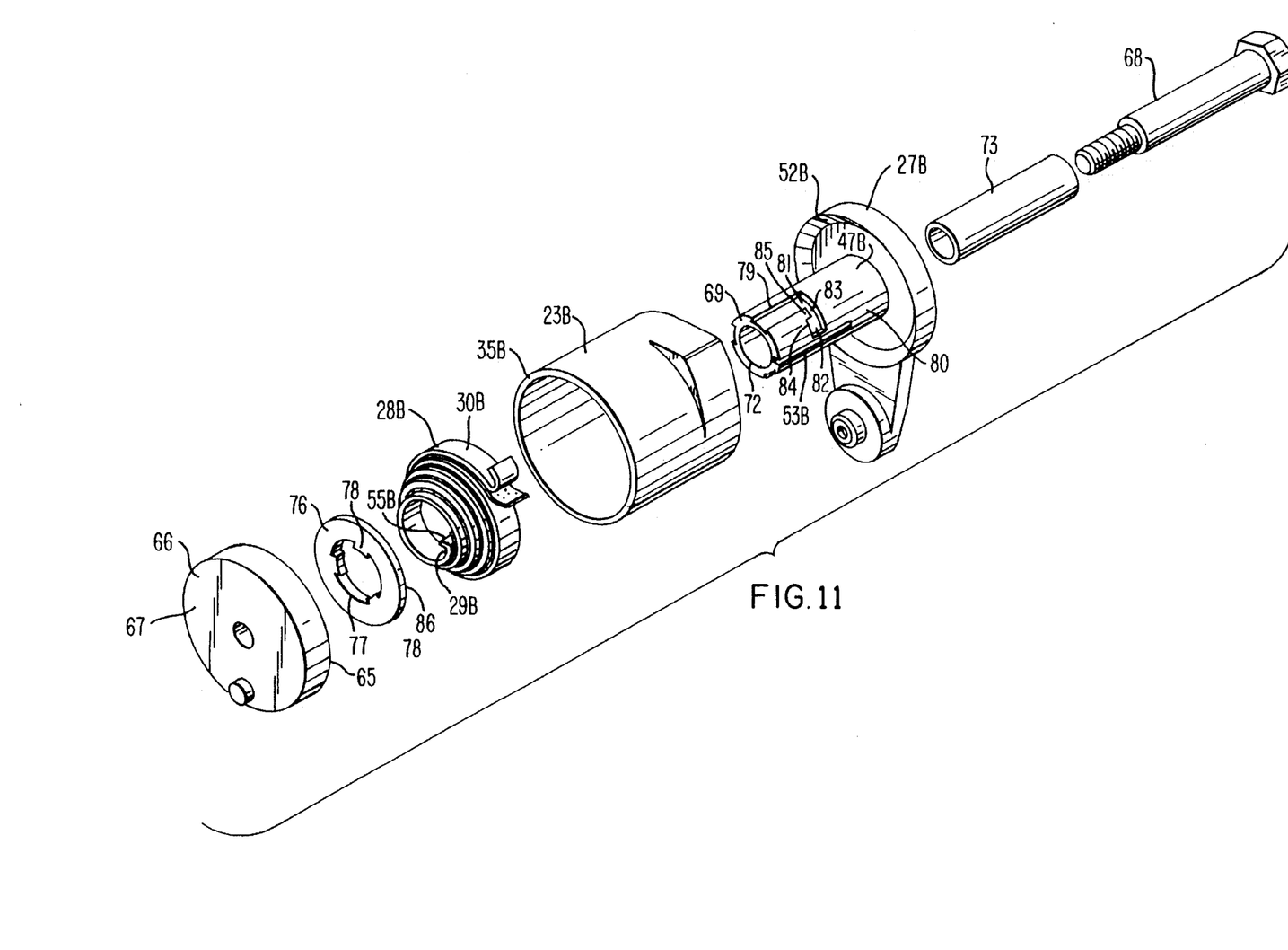
FIG. 11 is an exploded perspective of the various parts that form the belt tensioner of FIGS. 8–10.

The plate 76 has an opening 77 passing therethrough and is provided with a plurality of inwardly directed tangs 78 which are adapted to align with elongated slots 79 formed in an external peripheral surface 80 of the tubular part 47B of the belt engaging arm 27B so that the plate 76 can be moved to inner ends 81 of the slots 79 and then be rotated to position the ears or tangs 78 in adjacent slot portions 82 which are interconnected respectively to the slots 79 by interconnecting slot portions 83 so that the tangs or ears 78 will be held against the inner edges 84 of the slot portions 82 and cannot be rotated past the tang-like areas 85 of the tubular part 47B of the belt engaging arm 27B by the axial force of the spring 28B acting on a side 86 of the plate 76 as illustrated in FIG. 9.

Thus, it can be seen that it is a relatively simple method of this invention to make the tensioner 22B of this invention by inserting the plate 76 into position after the spring 28B has been disposed on the tubular portion 47B of the assembled belt engaging arm 27B by having the inner tang 55B inserted in the slot 53B and with the outer end tang 30'B of the spring 28B being received in the angled and closed ended slot 41B of the support member 23B, the plate 76 being assembled on the tubular part 47B of the belt engaging arm 27B and then being rotated into the locking slots 82 in the manner previously described to axially compress the spring 28B for the reasons previously set forth. Thereafter, the support plate 76 is then assembled over the end 69 of the pivot part 47B of the belt engaging arm 27B and has the side 65 thereof ultrasonically welded to the open end 35B of the support member 23B in the manner previously set forth to substantially seal the spring chamber means 56B for the reasons previously set forth.

Thereafter, the sleeve 73 can be disposed in the opening 72 of the belt engaging arm 27B and the single fastening member 68 can be utilized to fasten the tensioner 22B to the support structure 24B in the manner fully described in the aforementioned U.S. Patent to Henderson, U.S. Pat. No. 4,596,538 whereby a further discussion of the mounting of the tensioner 22B to the support member 24B need not be set forth.

Further, since the operation of the tensioner 22B is substantially identical to the tensioner 22 previously described, a further discussion of the operation of the tensioner 22B also need not be set forth.

It is believed that the tensioners of this invention overcome a two-fold problem with prior known tensioners, namely, the prior known tensioners have difficulty in obtaining parallelism and maintaining dampening level as the tensioners wear. Parallelism is difficult to maintain due to the small bearing size and minimum surface areas available in prior known tensioners. In addition, in prior known tensioners multiple clearance stack-up occurs in pivot bearing areas. Increased dampening levels are achieved with the angled dampening surfaces at maximum available diameters as set forth in the aforementioned U.S. Patent to Sidwell et al, U.S. Pat. No. 5,149,306.

Thus, low cost of the tensioners of this invention is addressed by decreasing the number and complexity of parts and using less expensive materials and processes with the tensioners of this invention. For example, with a flange mounted tensioner, prior known tensioners use eight parts whereas with the new tensioner 22 of this invention just four parts are utilized. Similar part reduction is provided by the new tensioner 22B of this invention that uses a center mounting bolt for fastening the same to a support structure.

Also, it is believed that the support member of each of the tensioners of the invention can be uniquely formed such that the resulting spring chamber means provided therein is substantially sealed from contamination.

Thus, it can be seen that this invention not only sets forth a new tensioner and a new part for such a tensioner, but also this invention sets forth a new method for making such a tensioner and a new method of making such a new part.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a tensioner for a power transmission belt that is adapted to be operated in an endless path, said tensioner comprising a support member for being fixed relative to said belt, a belt engaging arm movably carried by said support member, and a spiraled spring having an outer end interconnected to said support member and having an inner end interconnected to said belt engaging arm for urging said belt engaging arm relative to said support member and against said belt with a force to tension said belt, said support member having a pivot opening passing therethrough, said belt engaging arm having a pivot part thereof rotatably disposed in said pivot opening so as to rotate therein, the improvement wherein said support member has an internal wall means provided with an abutment means extending inwardly therefrom and cooperating therewith to define an angled and closed ended slot means therebetween that receives said outer end of said spring therein to interconnect said outer end of said spring to said support member.

2. A tensioner as set forth in claim 1 wherein said support member is formed of polymeric material and has an annular surface disposed substantially concentrically about the longitudinal axis of said pivot opening thereof, said belt engaging arm having an annular surface directly disposed in sliding engagement with said annular surface of said support member.

3. A tensioner as set forth in claim 2 wherein said inner end and said outer end of said spring are axially offset relative to each other so that said spring urges said annular surfaces together with a certain force.

4. A tensioner as set forth in claim 3 wherein said annular surfaces are respectively disposed at an angle relative to said longitudinal axis of said pivot opening.

5. A tensioner as set forth in claim 1 wherein said inner end and said outer end of said spring are axially offset relative to each other so that said spring urges a part of said belt engaging arm toward a part of said support member with a certain force.

6. A tensioner as set forth in claim 5 wherein said belt engaging arm has a plate means against which said inner end of said spring bears.

7. A tensioner as set forth in claim 6 wherein said plate means comprises said pivot part of said belt engaging arm.

8. A tensioner as set forth in claim 7 wherein said support member is cup-shaped so as to have an open end and a closed end, said pivot opening comprising said open end of said support member and said plate means of said belt engaging arm closing said open end of said support member.

9. A tensionser as set forth in claim 6 wherein said pivot part of said belt engaging arm comprises a tubular section having opposed ends, said plate means being disposed on said tubular section intermediate said ends thereof.

10. A tensioner as set forth in claim 9 wherein said support member has an opening disposed in alignment with said tubular section for receiving a fastening member therethrough for mounting said tensioner to a supporting structure by said fastening member.

11. In a method of making a tensioner for a power transmission belt that is adapted to be operated in an endless path, said tensioner comprising a support member for being fixed relative to said belt, a belt engaging arm movably carried by said support member, and a spiraled spring having an outer end interconnected to said support member and having an inner end interconnected to said belt engaging arm for urging said belt engaging arm relative to said support member and against said belt with a force to tension said belt, said support member having a pivot opening passing therethrough, said belt engaging arm having a pivot part thereof rotatably disposed in said pivot opening so as to rotate therein, the improvement comprising the step of forming said support member to have an internal wall means provided with an abutment means extending inwardly therefrom and cooperating therewith to define an angled and closed ended slot means therebetween that receives said outer end of said spring therein to interconnect said outer end of said spring to said support member.

12. A method of making a tensioner as set forth in claim 11 and comprising the steps of forming said support member of polymeric material and to have an annular surface disposed substantially concentrically about the longitudinal axis of said pivot opening thereof, and forming said belt engaging arm to have an annular surface directly disposed in sliding engagement with said annular surface of said support member.

13. A method of making a tensioner as set forth in claim 12 and comprising the step of forming said inner end and said outer end of said spring to be axially offset relative to each other so that said spring urges said annular surfaces together with a certain force.

14. A method of making a tensioner as set forth in claim 13 and comprising the step of disposing said annular surfaces respectively at an angle relative to said longitudinal axis of said pivot opening.

15. A method of making a tensioner as set forth in claim 11 and comprising the step of forming said inner end and said outer end of said spring to be axially offset relative to each other so that said spring urges a part of said belt engaging arm toward a part of said support member with a certain force.

16. A method of making a tensioner as set forth in claim 15 and comprising the step of forming said belt engaging arm to have a plate means against which said inner end of said spring bears.

17. A method of making a tensioner as set forth in claim 16 and comprising the step of forming said plate means to comprise said pivot part of said belt engaging arm.

18. A method of making a tensioner as set forth in claim 17 and comprising the steps of forming said support member to be cup-shaped so as to have an open end and a closed end, and forming said pivot opening to comprise said open end of said support member and said plate means of said belt engaging arm to close said open end of said support member.

19. A method of making a tensioner as set forth in claim 16 and comprising the steps of forming said pivot part of said belt engaging arm to comprise a tubular section having opposed ends, and disposing said plate means on said tubular section intermediate said ends thereof.

20. A method of making a tensioner as set forth in claim 19 and comprising the step of forming said support member to have an opening disposed in alignment with said tubular section for receiving a fastening member therethrough for mounting said tensioner to a supporting structure by said fastening member.

* * * * *